(12) United States Patent
Kawada

(10) Patent No.: US 8,418,999 B2
(45) Date of Patent: Apr. 16, 2013

(54) VIBRATION DAMPING SYSTEM

(75) Inventor: Masayoshi Kawada, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 873 days.

(21) Appl. No.: 12/442,045

(22) PCT Filed: Sep. 21, 2007

(86) PCT No.: PCT/JP2007/068421
§ 371 (c)(1),
(2), (4) Date: Apr. 29, 2009

(87) PCT Pub. No.: WO2008/035774
PCT Pub. Date: Mar. 27, 2008

(65) Prior Publication Data
US 2010/0007069 A1 Jan. 14, 2010

(30) Foreign Application Priority Data
Sep. 21, 2006 (JP) .................................. 2006-255248

(51) Int. Cl.
*F16F 7/00* (2006.01)
(52) U.S. Cl.
USPC .................... 267/141.1; 267/140.11; 267/141; 267/293
(58) Field of Classification Search ............... 267/141.2, 267/141.1, 141, 293, 294, 140.4, 140.3, 136, 267/139, 140, 140.11; 52/167.7, 167.8
See application file for complete search history.

(56) References Cited

U.S. PATENT DOCUMENTS

| 4,593,502 | A | * | 6/1986 | Buckle | 52/167.7 |
| 5,201,155 | A | * | 4/1993 | Shimoda et al. | 52/167.7 |
| 5,641,153 | A | * | 6/1997 | Gwinn | 267/294 |
| 5,765,322 | A | * | 6/1998 | Kubo et al. | 52/167.7 |
| 5,833,038 | A | | 11/1998 | Sheiba | |
| 6,385,918 | B1 | * | 5/2002 | Robinson | 52/167.8 |
| 7,856,766 | B2 | * | 12/2010 | Takenoshita et al. | 52/167.8 |

FOREIGN PATENT DOCUMENTS
DE  10212075 A  10/2003
(Continued)

OTHER PUBLICATIONS

Chinese Office Action in Chinese counterpart Application No. 200780042733.X, dated Jul. 30, 2010 (with translation) (13 pages).

(Continued)

*Primary Examiner* — Pamela Rodriguez
(74) *Attorney, Agent, or Firm* — Sughrue Mion, PLLC

(57) ABSTRACT

A vibration damping system (10) includes a laminated body (16) formed by alternately laminating rigid hard plates (12) and viscoelastic soft plates (14). At both ends in the laminating direction, the laminated body (16) is connected to a vibration generation section and a vibration receiving section, respectively. The soft plate (14) arranged in a region subjected to a higher isostatic stress is made thicker than the soft plates (14) arranged in other regions. Even when the vibration damping system (10) is applied with vibration having a large amplitude and prying deformation is thereby caused, the soft members (14) are prevented from isostatic fracture to provide a significantly improved durability of the vibration damping system (10).

9 Claims, 8 Drawing Sheets

FOREIGN PATENT DOCUMENTS

| | | | |
|---|---|---|---|
| EP | 0419057 | A | 3/1991 |
| GB | 2342975 | A | 4/2000 |
| JP | 11-141181 | A | 5/1999 |
| JP | 11-230265 | A | 8/1999 |
| JP | 2001-108000 | A | 4/2001 |
| JP | 2006-57833 | A | 3/2006 |
| JP | 2007-333052 | A | 12/2007 |

OTHER PUBLICATIONS

Japanese Office Action issued Apr. 10, 2012 for counterpart Japanese Application No. 2006-255248.

Japanese Office Action dated Jul. 10, 2012 issued in corresponding Japanese Patent Application No. 2006-255248.

* cited by examiner

VIBRATION DAMPING SYSTEM

CROSS REFERENCE TO RELATED APPLICATIONS

This application is a National Stage of International Application No. PCT/JP2007/068421 filed Sep. 21, 2007, claiming priority based on Japanese Patent Application No. 2006-255248, filed Sep. 21, 2006, the contents of all of which are incorporated herein by reference in their entirety.

TECHNICAL FIELD

The present invention relates to a vibration damping system comprising a laminated body including a plurality of hard plates having a rigidity, and a plurality of soft members having a viscoelasticity, wherein the hard plates and the soft members are alternately laminated with each other.

BACKGROUND ART

Conventionally, in order to damp and absorb vibrations transmitted from a vibration generating section, such as a linkage for supporting a load-carrying platform or the like, to a vibration receiving section, such as an axle or the like, there is an instance in which a vibration damping system is arranged between the vibration generating section and the vibration receiving section, wherein the vibration damping system is comprised of a laminated body including a plurality of hard plates having a rigidity, and a plurality of soft members having a viscoelasticity, with the hard plates and the soft members being alternately laminated with each other. When a vibration damping system including such a hybrid laminated body is arranged between the vibration generating section and the vibration receiving section, shocks or vibrations generated in the vibration generating section are damped and attenuated by the hybrid laminated body, thereby allowing lowering of the vibration level transmitted to the vibration receiving section.

Such a hybrid laminated body is generally designed so as to allow a relatively large deformation in the horizontal direction while supporting the weight of the vibration generating section. Thus, when the hybrid laminated body is subjected to a vibration while supporting the weight of the vibration generating section, i.e., while a positive pressure is being applied to the hybrid laminated body, the hybrid laminated body undergoes a shearing deformation primarily in the horizontal direction. On this occasion, however, because the lower end side of the vibration damping system is restrained by the vibration receiving section side, a so-called prying deformation occurs to the hybrid laminated body upon input of a vibration with a large amplitude. As a result of the prying deformation, one end of the hybrid laminated body in the laminating direction is applied with a compressive deformation and the other end is applied with a tensile deformation.

With increase in the amplitude of the input vibration, the degree of prying deformation occurring in the hybrid laminated body increases, and so does the degree of the tensile deformation of the laminated body. In this instance, because the soft member is made of a non-compressive material, and has a relatively large restrained surface as opposed to a small free surface area, there is a problem of isostatic stress concentration that occurs at the center portion of the restrained surface upon occurrence of the tensile deformation, thereby leading to a premature isostatic fracture even upon a relatively small tensile deformation.

Here, the meaning of the technical term "isostatic fracture" will be explained below. In ordinary vibration damping rubber which essentially does not include hard members, there is a relatively large free surface area. Thus, when a tensile force is applied to the rubber, based on its entering deformation into the inside of the external rubber portion, the rubber is allowed to undergo an elongation deformation without causing change in volume. In contrast, in the vibration damping system wherein a plurality of hard plates are embedded to have a large restraining surface area for the soft members made of rubber, as in the structure to which the present invention is applicable, when a tensile force is applied, the structure is allowed to deform in the region adjacent to the outer periphery, though the structure assumes a tensile state in its inside. In such a state, when the stress level, or the isostatic stress level, increases beyond a threshold level, there is an instance wherein the soft members due to its increased volume undergoes a fracture. This sort of phenomena is called as "isostatic fracture."

There has been proposed, e.g., as disclosed in JP 2006-057833A, a vibration damping system including a hybrid laminated body wherein a plurality of hard plates having a rigidity, and a plurality of soft members having a viscoelasticity are alternately laminated with each other, a pair of flange members provided at both end portions of the hybrid laminated body in the laminating direction, and a displacement restriction member in the form of a chain accommodated in the hybrid laminated body for connecting the flange members with each other while causing a tensile force between the flange members s as to reduce the isostatic stress. In such a structure, the chain accommodated in the hybrid laminated body places the soft members under a pre-compressed state upon production of the vibration damping system so as to reduce the input level of the tensile load. Thus, as compared to the arrangement in which the displacement restriction member is not provided, it has been actually confirmed that the isostatic stress can be reduced to one half with respect to the predetermined degree of the prying deformation, and a significant improvement can be achieved in terms of the service life of the vibration damping system. It would be desirable, however, to make further improvements in the vibration damping system according to the proposal as explained above.

DISCLOSURE OF THE INVENTION

In view of the background art as explained above, the task of the present invention is to provide an improved vibration damping system capable of effectively preventing fracture even under a vibration with a large amplitude in the shearing direction, to cause a prying deformation, and also to provide a production method thereof.

As a solution for the above-mentioned task, one aspect of the present invention resides in a vibration damping system comprising: a laminated body including a plurality of hard plates having a rigidity, and a plurality of soft members having a viscoelasticity, said hard plates and said soft members being alternately laminated with each other; said laminated body having one end portion in a laminating direction, said one end portion being connected to one of a vibration generation section and a vibration receiving section, and another end portion in the laminating direction, said another end portion being connected to the other of the vibration generation section and the vibration receiving section; wherein, among said plurality of soft members, the soft member that is arranged in a region, which is subjected to a higher isostatic pressure, is thicker than the soft members that are arranged in other regions.

With the vibration damping system according to the present invention, when a vibration is generated in the vibration generating section, the soft members included in the hybrid laminated body are deformed to damp the vibration, so that less vibration is transmitted to the side of the vibration receiving section. In other words, according to the present invention, when a displacement is repeatedly input to the vibration damping system due to the vibration, each of the soft members, which are made of rubber, for example, is deformed in accordance with the vibration input to mitigate the vibration.

In the case of a vibration damping system including a hybrid laminated body wherein a plurality of hard plates having a rigidity, and a plurality of soft members having a viscoelasticity are alternately laminated with each other; although the structure exhibits a high durability against compression, there may be caused a fracture of the soft members when a tensile load is applied. This is because the soft members when applied with a tensile load do not exhibit a change in volume due to its incompressibility, with the result that the isostatic stress increases in the inside which cannot be deformed. Such an isostatic fracture also occurs even in the absence of the tensile force, when a vibration with a large amplitude in the shearing direction is input and a prying deformation is thereby caused, in the manner that both end portions of the hybrid laminated body are rotated relative to each other. In other words, as the movement of the soft members restrained between the hard plates is reduced, if a vibration with a large amplitude in the shearing direction is input and a prying deformation is thereby caused, one end portion of the hybrid laminated body undergoes a compressive deformation, though the other end portion undergoes a tensile deformation, so that stresses are concentrated to the soft members which cannot be deformed inside, enhancing the tendency of fracture of the soft members.

Thus, according to the present invention, the soft member is made thicker in the region of a higher isostatic stress, to have a larger free surface area of the soft member, to thereby optimize the volume balance of each layer of the soft members and reduce the residual stress inside of the soft members. As a result, even when a vibration with a large amplitude in the shearing direction is input and a prying deformation is thereby caused, it is possible to reduce the isostatic stress in the soft member on the side of the tensile deformation, to suppress formation of cracks that may occur in the soft members included in the hybrid laminated body, to effectively prevent damages to the hybrid laminated body and to significantly prolong the service life of the vibration damping system.

Incidentally, a laminated-type vibration damping rubber wherein the thickness of the plurality of rubber plates is intentionally changed is disclosed, e.g., in JP 54-030371A and JP 8-060746A. The laminated-type vibration damping rubber as know form these patent documents has a structure, of which the strength is improved by gradually decreasing the thickness of the rubber plate from the center region toward the edge portions. Also, a laminated rubber of a structure wherein the diameter is gradually changed in the laminating direction in order to prevent buckling is disclosed, e.g., in JP 1-035134A. However, none of these patent documents discloses a structure that is relevant to the task and solution according to the present invention.

When a prying deformation occurs in the vibration damping system, there is formed a drooping point in a region close to the fixed end of the hybrid laminated body, which is subjected to a high isostatic stress. Therefore, it is preferred that one end portion of the laminated body in the laminating direction forms a fixed end that is fixedly connected to one of the vibration generation section and the vibration receiving section, another end portion of the laminated body in the laminating direction forms a free end that is movably connected to the other of the vibration generation section and the vibration receiving section, and the soft member is made softer in a region adjacent to the fixed end of the laminated body, than in other regions. In this instance, by designing the soft member arranged in the region adjacent to the fixed end of the laminated body to have an increased thickness, it is possible to effectively suppress occurrence of failures.

It is preferred that the plurality of soft members are arranged so that their thickness is gradually reduced from the fixed and toward the free end of the laminated body. In other words, the soft member is designed to have a thickness, which is increased in the region of the fixed end side, where the isostatic stress increases as the prying deformation occurs on the side of the free end portion, and which is gradually reduced toward the free end side where the isostatic stress is not so large, thereby making it possible to effectively and efficiently suppress occurrence of failures.

In the vibration damping system as explained above, it is preferred that, among the plurality of the soft members, the soft member arranged closest to the fixed end of the laminated body has a thickness, which is within a range from 1.3 times to 1.7 times of the thickness of the soft member arranged closest to the free end of the laminated body. In this instance, by optimally determining the thickness ratio of the soft members between the both end sides of the hybrid laminated body, it is possible to efficiently suppress occurrence of failures while maintaining the desired supporting rigidity of the vibration damping system.

It is preferred that the plurality of the soft members are each made of rubber. In this instance, because a rubber material having a high vibration damping effect is applied as the soft material, it is possible to more suitably reduce the vibration.

It is preferred that the vibration damping system further comprises: a pair of flange members connected to the vibration generation section and the vibration receiving section, respectively; means for defining a cavity in the laminated body, so that the cavity extends through the laminated body in the laminating direction; and a displacement restriction member arranged in the cavity with its both end portions connected to the pair of the flange members, wherein the displacement restriction member has a rigidity to a tensile load along the laminating direction of the laminated body, which rigidity is higher than that of the laminated body, and wherein the displacement restriction member is deformable in a shearing direction intersecting at right angles to the laminating direction. In this instance, the vibration damping system can be maintained in a state (tension state) in which the displacement restriction member is always under tension between the pair of the flange members, due to the restoring force exerted from the hybrid laminated body. When a tensile load is applied to the hybrid laminated body due to vibration, the tensile load is partly supported by the displacement restriction member, so that it is possible to effectively reduce the tensile stress occurring in the hybrid laminated body in the laminating direction by means of the displacement restriction member.

Moreover, because the displacement restriction member has a rigidity to a tensile load along the laminating direction of the laminated body, which rigidity is higher than that of the laminated body, even when a tensile load is applied to the hybrid laminated body together with an external force acting in the shearing direction, it is possible to prevent an excessive deformation of the hybrid laminated body in the shearing direction, and to reduce the deformation of the hybrid laminated body in the tensile direction.

As a result, with the vibration damping system configured as explained above, even when a tensile load is applied to the hybrid laminated body, it is possible to reduce the tensile stress occurring in the hybrid laminated body and to mitigate the stress concentration due to an increased deformation of the hybrid laminated body in the shearing direction, thereby effectively preventing occurrence of failures of the hybrid laminated body.

It is preferred that the displacement restriction member is comprised of a link chain which, in turn, is comprised of a plurality of link elements that are linearly connected to each other. When the displacement restriction member is comprised of a link chain, it is possible to achieve that above-mentioned function of the vibration damping system in a more positive manner.

The present invention in another aspect resides in a production method for producing a vibration damping system, wherein the production method comprises a step of using a mold having at least one injection gate for injecting a material for constituting the soft members, said injection gate being designed so that material for constituting the soft members can be injected to form a plurality of soft members between the hard plates, so that each soft member has a different thickness, wherein the injection gate has an opening sectional area that is variable in accordance with a change in thickness of the soft members.

The above-mentioned production method is applied to produce a vibration damping system including a laminated body wherein a plurality of hard plates having a rigidity, and a plurality of soft members having a viscoelasticity, are alternately laminated with each other. In this instance, each soft member is formed between the relevant hard plates, by injecting a material for constituting the soft members from the injection gate into the interior of the mold.

In the vibration damping system produced by the method according to the present invention, which includes the above-mentioned hybrid laminated body, one end portion of the laminated body in a laminating direction may be connected, for example, to one of the vibration generation section and the vibration receiving section, with the other end portion in the laminating direction connected to the other of the vibration generation section and the vibration receiving section. In such a connected state of the vibration damping system, when vibration is generated in the vibration generating section, it is possible to damp and absorb the vibration due to the deformation of the plurality of soft members included in the hybrid laminated body, thereby ensuring that less vibration is transmitted to the vibration receiving section.

For producing the vibration damping system according to the present invention, there is used a mold for forming a plurality of soft members which are different from each other in thickness. To this end, the mold may be provided with a plurality of injection gates each having an opening sectional area which is made smaller as the thickness of the soft member is reduced. In this instance, the hybrid laminated body is completed by injecting a material for constituting the soft members, from the respective injection gates into the interior of the mold. Since each injection gate has an opening sectional area which is made smaller as the thickness of the soft member is reduced, the injection pressure of the material injected from the respective injection gates can be substantially equalized, thereby preventing flexural deformation, etc., of the soft members to be situated between the relevant hard plates, due to the difference in the injection pressure, which mat be otherwise caused.

Thus, the production method according to the present invention readily allows production of the vibration damping system including a hybrid laminated body of a structure in which the soft member arranged in a region subjected to a high isostatic stress is made relatively thick. It is also possible to more positively achieve the functional effects of suppressing possible formation of cracks in the soft members included in the vibration damping system and effectively preventing damages to the hybrid laminated body, thereby prolonging the service life of the vibration damping system.

It is preferred that the opening cross-sectional area of the injection gate is proportionally variable in accordance with the change in thickness of the soft members. In this instance, it is possible to more positively achieve the above-mentioned functional effects of the invention.

As explained above, the present invention provides a vibration damping system and a method for producing such a structure, wherein occurrence of damages can be effectively prevented even when vibration with a large amplitude in the shearing direction is input and a prying deformation is caused. This is the most significant effect of the present invention.

BRIEF DESCRIPTION OF THE DRAWINGS

The present invention will be further described below with reference to preferred embodiments shown in the accompanying drawings, wherein.

REFERENCE NUMERALS

| | |
|---|---|
| 10 | Vibration damping system |
| 12 | Hard plates |
| 14 | Rubber plates (soft members) |
| 16 | Laminated rubber body (hybrid laminated body) |
| 17 | Cavity |
| 18 | Flange member |
| 20 | Flange member |
| 28 | Link chain (displacement restriction member) |
| 50 | Mold |
| 50A | Upper mold member |
| 50B | Lower mold member |

-continued

| 56 | Injection gates |
| M  | Material        |

BEST MODE FOR CARRYING OUT THE INVENTION

First Embodiment

Vibration Damping System

Figure 1:
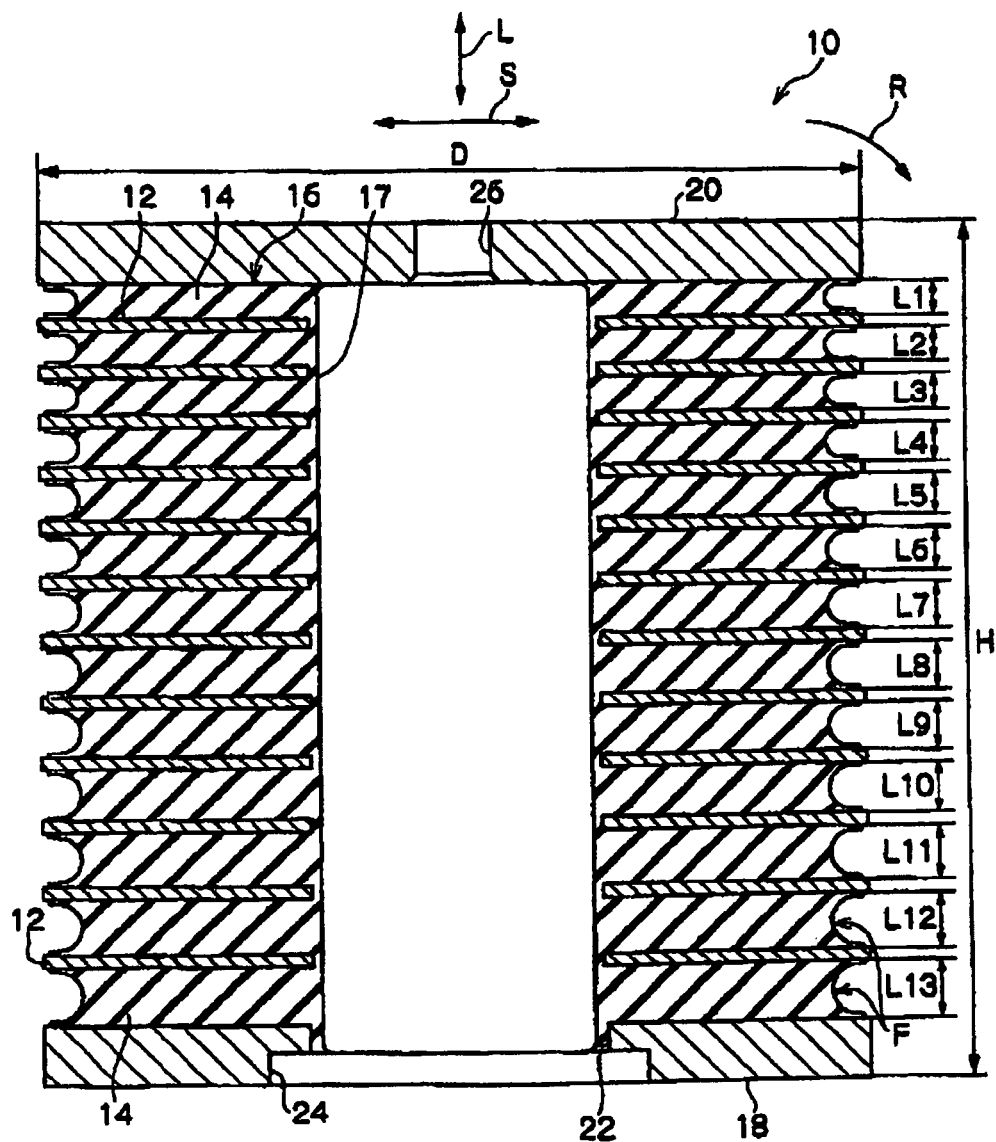
FIG. 1 is a sectional view showing a first embodiment of the vibration damping system according to the present invention.

There is shown in FIG. 1 a first embodiment of the vibration damping system 10 according to the present invention. The vibration damping system 10 includes a laminated rubber member 16 in the form of a hybrid laminated body wherein a plurality of hard plates 12, which can be regarded essentially as a rigid body, and a plurality of rubber plates 14 as soft members (e.g., 13 layers as in the illustrated embodiment) are alternately laminated with each other.

The laminated rubber body 16 is in the form of a thick-walled cylinder having in its center region a columnar cavity 17 that extends through the laminated rubber body 16 in the laminating direction. That is to say, the hard plates 12 and the rubber plates 14 are each formed into an annular shape and adhered to each other by vulcanization so as to be integrated as the laminated rubber body 16.

The hard plates 12 forming part of the laminated rubber body 16 may be comprised of a suitable metal material, such as iron, aluminum, etc. Besides a metal material, the hard plates 12 may be comprised of a suitable resin material, such as nylon, which may be adhered to the rubber plates 14 as is the case with the metal material. Furthermore, the rubber plates 14 are generally formed by molding various types of vulcanized rubber as the raw material. Such rubber material may include, for example, ethylene-propylene rubber (EPR, EPDM), nitrile rubber (NBR), butyl rubber, halogenated butyl rubber, chloroprene rubber (CR), natural rubber (NR), isoprene rubber (IR), styrene-butadiene rubber (SBR), butadiene rubber (BR), and a blend thereof. Alternatively, there may be used a suitable elastomer material other than the rubber material.

On both outer sides of the laminated rubber body 16 in the laminating direction, there are arranged a pair of flange members 18, 20, respectively, which are formed of rectangular metal plates. The pair of the flange members 18, 20 are fixedly secured to the lower and upper end surfaces of the laminated rubber body 16, respectively, so as to hold the laminated rubber body 16 therebetween in the laminating direction.

The flange member 18 situated on the lower end side has a center region, which is formed with a circular opening 22 facing the cavity 17 in the laminated rubber member 16. The lower surface of the flange member 18 has a recessed fitting portion 24, which extends along the periphery of the opening 22. The flange member 20 situated on the upper side has a center region, which is formed with an insertion hole 26 of a diameter that is smaller than the cavity 17 of the laminated rubber body 16. In the illustrated embodiment, however, the opening 22 or the insertion hole 26 need not be formed in the flange members 18, 20, and these flange members 18, 20 mat be comprised of simple metal plates without such opening or hole. Moreover, the hard plates 12 and the rubber plates 14 may be disc-shaped, instead of annular shape, such that the laminated rubber body 16 has a structure without the cavity 17.

In the present embodiment, the lower end of the laminated rubber body 16 is formed as a fixed end that is fixedly secured, through the flange member 18, to the vibration receiving section, such as an axel. The upper end of the laminated rubber body 16 is formed as a free end that is movably connected, through the flange member 20, to a vibration generating section, such as a linkage for supporting a load-carrying platform. In the present invention, the thirteen layers of the rubber plates 14 forming part of the laminated rubber body 16 are made different from each other in thickness.

More specifically, the thirteen layers of the rubber plates 14 are successively laminated with each other such that the thickness of the rubber plates 14 is gradually decreased from the fixed end side toward the free end side, and the rubber plate 14 arranged in a region closest to the fixed end is thicker than the rubber plates 14 in other regions. Although the concrete thickness of the rubber plates 14 is determined depending upon the dimension (total height, outer diameter, etc.) of the product or use conditions, it has been found by an FEM analysis that an optimum ratio between the thickness of the rubber plate 14 closest to the fixed end, to the thickness of the rubber plate 14 closest- to the free end, lies within a range from 1.3 to 1.7, from the viewpoint of reduction in stress level, preservation of supporting rigidity, etc.

It is noted that an isostatic stress occurs in the rubber plate 14 not only when a tensile load is applied, but also when vibration with a large amplitude in the shearing direction (i.e., the direction of arrow S) is applied, thereby causing a prying deformation such that the flange member 20 arranged on the upper end side of the laminated rubber body 16 is twisted in the direction of arrow R. Taking this into account, according to the present embodiment, the rubber plate 14 subjected to a high isostatic stress is made relatively thick. Each rubber plate 14 has a thickness as denoted by symbols L1, L2, ... L12, L13 as seen from the upper end side or free end side, toward the lower end side or fixed end side. In this instance, the thickness L13 is within a range from 1.3 times to 1.7 times the thickness L1. Incidentally, the total height and the diameter of the vibration damping system 10 are denoted by symbols H and D, respectively.

As particularly shown in FIG. 1, the outer peripheral portion of each rubber plate 14 situated between the upper and lower hard plates 12 has a sectional shape known as fillet shape F, which is made circular. This circular fillet shape is adopted because stresses can be most effectively reduced by the circular shape in view of strain distribution within the rubber plate 14.

The operation of the vibration damping system 10 according to the first embodiment will be explained below. In the vibration damping system 10 of the present embodiment, a plurality of hard plates 12 having rigidity and a plurality of rubber plates 14 having viscoelasticity are alternately laminated with each other to form the laminated rubber body 16. The lower end of the laminated rubber body 16 as seen in the laminating direction is fixedly secured, through the flange member 18, to the vibration receiving section, such as an axel, while the upper end of the laminated rubber body 16 is formed as a free end that is movably connected, through the flange member 20, to a vibration generating section, such as a linkage for supporting a load-carrying platform. Thus, the vibration damping system 10 is interposed between the vibration generating section and the vibration receiving section, so as to support the vibration generating section above the vibration receiving section.

In this instance, the lower end of the laminated rubber body 16 as seen in the laminating direction forms the fixed end, which is fixedly secured to the vibration receiving section, and the upper end of the laminated rubber body 16 as seen in the laminating direction forms the free end, which is movably connected to the vibration generating section. As shown in FIG. 1, the plurality of rubber plates 14 are laminated with each other so that the thickness of the rubber plate 14 is gradually decreased from the fixed end side toward the free end side, and the rubber plate 14 arranged in a region close to the fixed end is thicker than the rubber plates 14 in other regions.

Upon occurrence of a prying deformation, a drooping point tends to be formed in a portion of the rubber plate 14 arranged in a region close to the fixed end, which is subjected to a high isostatic stress, thereby causing failures in it proximity. In contrast, in the vibration damping system according to the first embodiment, the rubber plate 14 arranged in a region close to the fixed end is thicker than the rubber plates 14 in other regions, making it possible to prevent occurrence of failures. According to the first embodiment, furthermore, among the plurality of rubber plates 14, the ratio between the thickness of the rubber plate 14 closest to the fixed end, to the thickness of the rubber plate 14 closest to the free end, for example, lies within a range from 1.3 to 1.7.

Also, as explained above, with the vibration damping system 10 according to the first embodiment, the vibration generating section is resiliently supported by the laminated rubber body 16 in the horizontal direction. Thus, when vibration is generated in the vibration generating section, the vibration is damped and attenuated by the function of internal friction or the like, due to the deformation of the plurality of rubber plates 14.

According to the first embodiment, the rubber plate 14 arranged in a region close to the fixed end, which is subjected to a high isostatic stress, is made relatively thick to provide a large free surface area, thereby optimizing the volume balance of each layer of the rubber plates 14 and achieving relaxation of the residual stresses within the rubber plates 14. By this, when vibration with a large amplitude in the shearing direction is input and a prying deformation occurs, it is possible to achieve reduction of the isostatic stress in the rubber plates 14 on the tensile deformation side, to suppress crack formation that may be otherwise cause in the rubber plates 14 forming the laminated rubber body 16, to effectively prevent damages to the laminated rubber body 16, and to prolong the service life of the vibration damping system 10.

Moreover, according to the first embodiment, the rubber plates 14 are arranged such that the rubber plate 14 on the side of the fixed end of the laminated rubber body 16, which is subjected to higher stresses due to the prying deformation in the free end side, has an increased thickness, and the thickness of the rubber plates 14 is gradually decreased from the fixed end side toward the free end side, which is not subjected to high stresses, thereby allowing an efficient suppression of failures.

Furthermore, according to the first embodiment, since, among the plurality of rubber plates 14, the ratio between the thickness of the rubber plate 14 closest to the fixed end, to the thickness of the rubber plate 14 closest to the free end, for example, lies within a range from 1.3 to 1.7, it is possible to most efficiently prevent occurrence of failures in the vibration damping system 10.

By designing the plurality of rubber plates 14 of the laminated rubber body 16 to have a mutually different thickness, it has been confirmed that the stresses in the hard plates 12 can be significantly reduced. In the conventional vibration damping system, when the hard plate 12 consists of an iron plate, there is a problem of crack formation in the iron plate due to insufficient strength, and it was thus necessary to use high tension steel plates. In contrast, the first embodiment effectively provides a safety margin for the strength, and thus allows use of a less expensive sheet material for general machining purposes, thereby allowing a significant reduction in the production cost of the vibration damping system 10.

Second Embodiment

Vibration Damping System

A second embodiment of the vibration damping system according to the present invention will be described below with reference to FIGS. 2 and 3. Those elements already described with reference to the first embodiment are denoted by the same reference numerals to eliminate an overlapping description. The vibration damping system according to the second embodiment has a structure in which, as shown in FIGS. 2 and 3, a displacement restriction member in the form of a metal link chain 28 is arranged in the cavity 17 of the laminated rubber body 16, as opposed to the first embodiment in which the cavity 17 in the laminated rubber body 16 is left vacant.

The link chain 28 is arranged so that its longitudinal axis coincides with the laminating direction of the laminated rubber body 16, and has sufficiently high rigidity and strength to a tensile load in the laminating direction, as compared to the laminated rubber body 16. The link chain comprises a plurality of link elements 30, 31, 32 (e.g., three link elements in the illustrated embodiment), which are linearly connected to each other. The link chain 28 allows bending between the link elements 30, 31, 32 so that the link chain as a whole is readily deformable in the shearing direction (i.e., the direction shown by arrow S), which intersects at right angles to the laminating direction.

Figure 2:
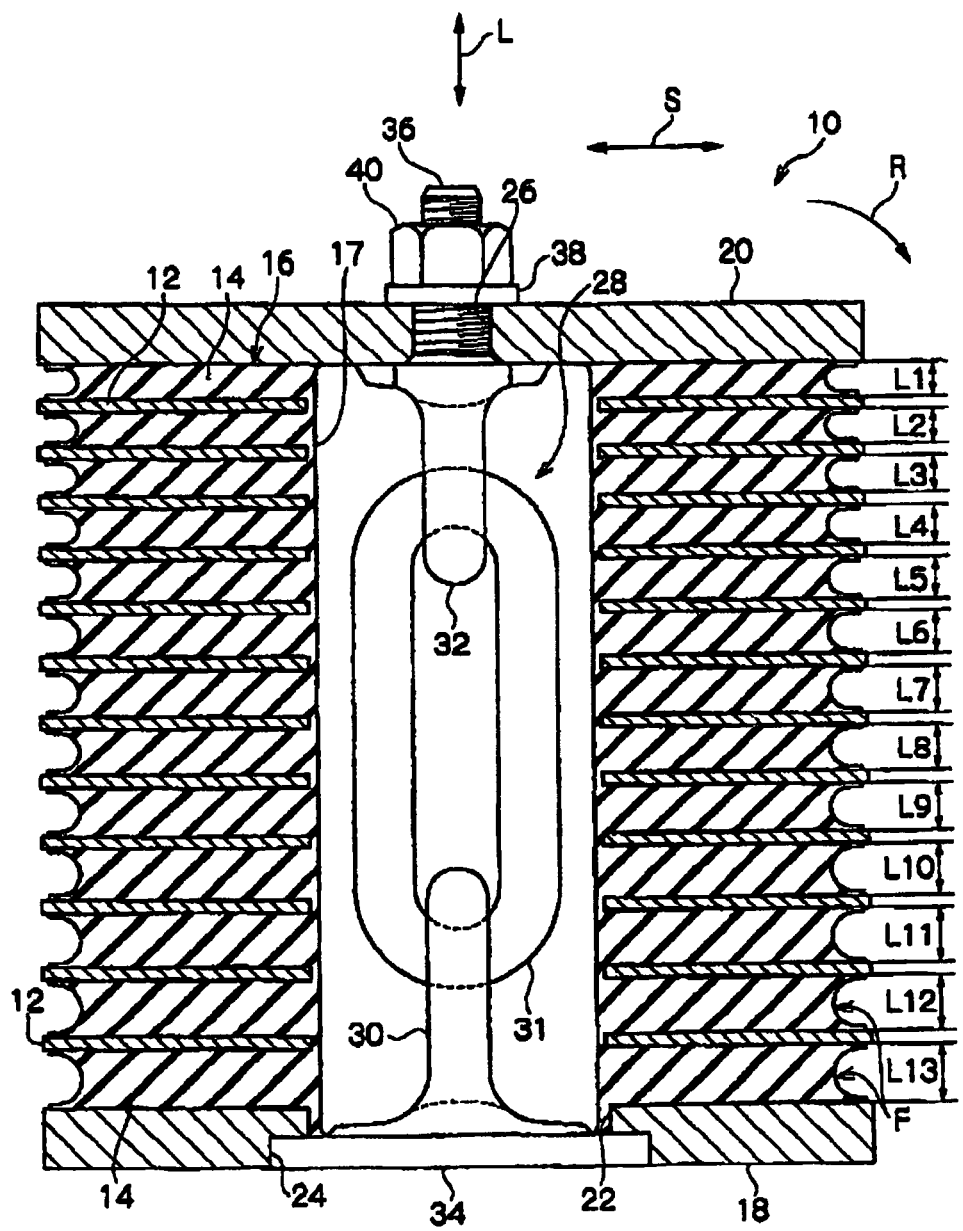
FIG. 2 is a sectional view showing a second embodiment of the vibration damping system according to the present invention.
Figure 3:
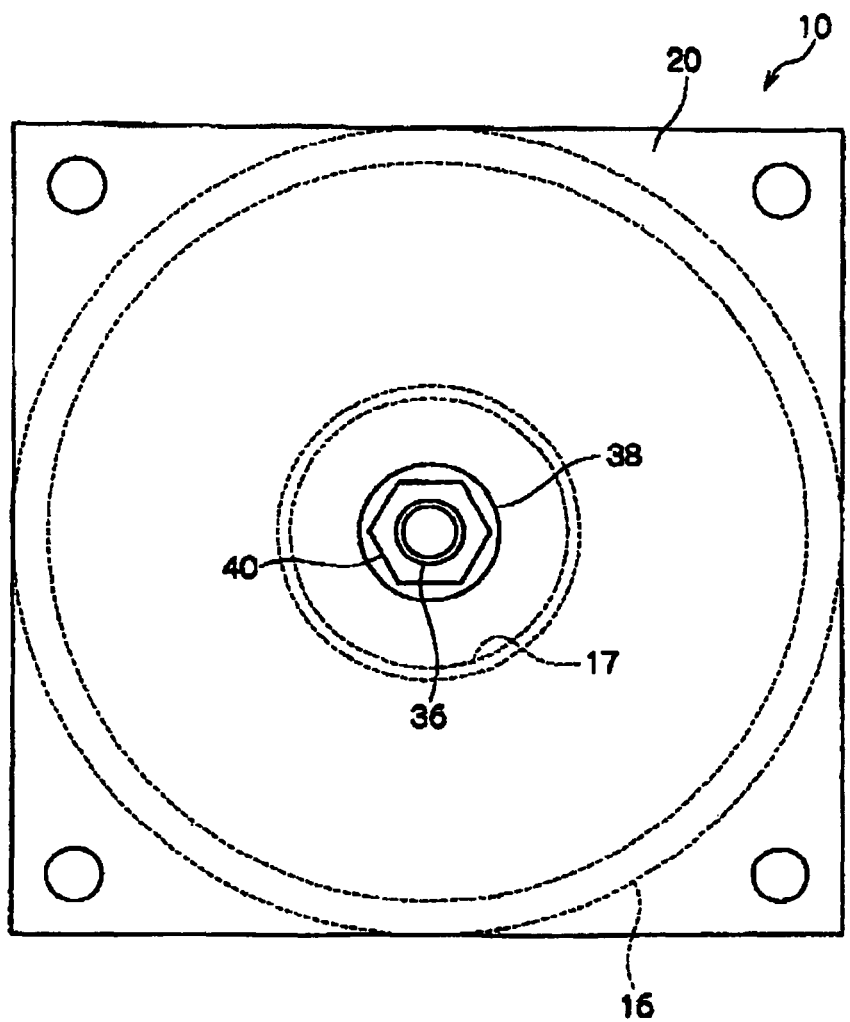
FIG. 3 is a plan view of the second embodiment.

With reference to the link chain shown in FIG. 2, the lowermost link element 30 has a lower end portion that forms a disc-shaped lid member 34. The uppermost link element 32 of the link chain 28 has an upper end portion in the form of a bolt shaft 36 that projects upwards. The link elements 30, 32 are produced by casting, forging, or the like, and are connected to the link element 31 to complete the link chain 28.

In assembling the vibration damping system 10, the link chain 28 is inserted into the cavity 17 of the laminated rubber body 16, through the opening 22 of the flange member 18. On this occasion, the bolt shaft 36 is passed through the hole 26 in the flange member 20, with its tip end side projecting to the outside beyond the flange member 20, and the lid member 34 closes the opening 22 of the flange member 18, with its outer periphery inserted into the fitting portion 24 of the flange member 18.

A washer 38 is fitted over the tip end side of the bolt shaft 36 projecting beyond the flange member 20, and a nut 40 is threadedly engaged with the tip end side. By this, the link chain 28 arranged in the cavity 17 of the laminated rubber body 16 has a lower end portion connected to the flange member 18 through the lid member 34, and an upper end portion connected to the flange member 20 through the bolt shaft 36.

Subsequently, the laminated rubber body 16 is compressed by a press machine or the like, to assume a compressed state with a predetermined compression ratio. In such a compressed state of the laminated rubber body 16, the nut 40 threadedly engaged with the tip end side of the bolt shaft 36 projecting beyond the flange member 20 is tightened so that there is no clearance between the nut 40 and the flange member 20 and a predetermined tightening torque is generated. By this, the laminated rubber body 16 is maintained in the compressed state with a predetermined compression ratio in the laminating direction, the resilient restoring force is applied to the flange members 18, 20 from the laminated rubber body 16 in its compressed state is supported by the link chain 28, and the link chain 28 is maintained in the stretched state (tension state) by such a restoring force.

To the extent that the vibration damping system 10 according to the second embodiment is disposed between the vibration generating section and the vibration receiving section so as to support the vibration generating section above the vibration receiving section, the second embodiment is essentially same in structure as the first embodiment.

It can be seen that the vibration damping system according to the second embodiment functions essentially in the same manner as the first embodiment. Thus, when vibration with a large amplitude in the shearing direction is input and a prying deformation occurs, it is possible mitigate concentration of stresses to the hard plates 12, and to achieve reduction of the isostatic stress in the rubber plates 14. As a result, it is possible to suppress crack formation that may be otherwise cause in the rubber plates 14 forming the laminated rubber body 16, to effectively prevent damages to the laminated rubber body 16, and to prolong the service life of the vibration damping system 10.

With the vibration damping system according to the second embodiment, furthermore, the link chain 28 is maintained in the stretched state (tension state) between the flange members 18, 20 by the restoring force of the laminated rubber body 16. In this instance, when a tensile load is applied to the laminated rubber body 16 due to the input vibration, the tensile load is partly supported by the link chain 28, thereby allowing the link chain 28 to reduce the tensile stress occurring in the laminated rubber body 16 in the laminating direction.

Since the link chain has a rigidity to the load in the tensile direction, which is higher than that of the laminated rubber body 16, it is possible to prevent an excessive deformation of the laminated rubber body in the shearing direction, and to reduce the deformation amount of the laminated rubber body 16 in the tensile direction.

As a result, with the vibration damping system according to the second embodiment, even when the laminated rubber body 16 is applied with a tensile load, it is possible to reduce the tensile stress occurring in the laminated rubber body 16, to mitigate the stress concentration due to an increased deformation amount of the laminated rubber body 16 in the shearing direction, and to effectively prevent failures of the laminated rubber body 16.

Comparison has been made with respect to various samples of the vibration damping system, which may be classified into different categories. In the first category, each sample includes a laminated rubber body 16 wherein the thickness of the rubber plates 14 is gradually decreased from the fixed end on the lower end side toward the free end on the upper end side. Other categories includes a sample wherein some of the rubber plates 14 are designed to have the same thickness, and a sample wherein all the rubber plates 14 are designed to have the same thickness. The thickness of each rubber plates 14 is denoted by symbols L1, L2, . . . L12, L13, as seen from the free end on the upper end side toward the fixed end on the lower end side. The detailed values of the thickness of the rubber plates 14 are shown in Table 1 below. It may be assumed, by way of examples only, that the vibration damping system 10 has a total height H of 280 mm, and a diameter D of 260 mm.

TABLE 1

| Thickness (mm) | Sample A | Sample B | Sample C | Sample D | Sample E |
|---|---|---|---|---|---|
| L1 | 14.5 | 12.7 | 11.5 | 10.9 | 12.0 |
| L2 | 14.5 | 13.0 | 12.1 | 11.5 | 12.0 |
| L3 | 14.5 | 13.3 | 12.6 | 12.1 | 12.0 |
| L4 | 14.5 | 13.6 | 13.1 | 12.7 | 12.0 |
| L5 | 14.5 | 13.9 | 13.6 | 13.3 | 12.8 |
| L6 | 14.5 | 14.2 | 14.1 | 13.9 | 13.5 |
| L7 | 14.5 | 14.5 | 14.5 | 14.5 | 14.2 |
| L8 | 14.5 | 14.8 | 15.0 | 15.1 | 15.0 |
| L9 | 14.5 | 15.2 | 15.5 | 15.8 | 15.7 |
| L10 | 14.5 | 15.5 | 16.0 | 16.4 | 16.4 |
| L11 | 14.5 | 15.8 | 16.5 | 17.0 | 17.1 |
| L12 | 14.5 | 16.1 | 17.0 | 17.6 | 17.8 |
| L13 | 14.5 | 16.4 | 17.5 | 18.2 | 18.5 |

The samples of the first category, wherein the thickness of the rubber plates 14 is gradually decreased, have a total rubber height of 189 mm and includes three samples, i.e., sample B wherein the thickness L13 is 1.3 times the thickness L1, sample C wherein the thickness L13 is 1.5 times the thickness L1, and sample D wherein the thickness L13 is 1.7 times the thickness L1. The samples of other categories include sample A provided with thirteen layers of the rubber plates 14, wherein all the rubber plates 14 are designed to have a constant thickness of 14.5 mm, and sample E wherein the rubber plates 14 are designed to have the same thickness of 12 mm from L1 up to L4, and remaining rubber sheets are designed to have gradually changing thickness. The total height H and the diameter D of the vibration damping system 10 are same for all the samples A to E.

Figure 4:
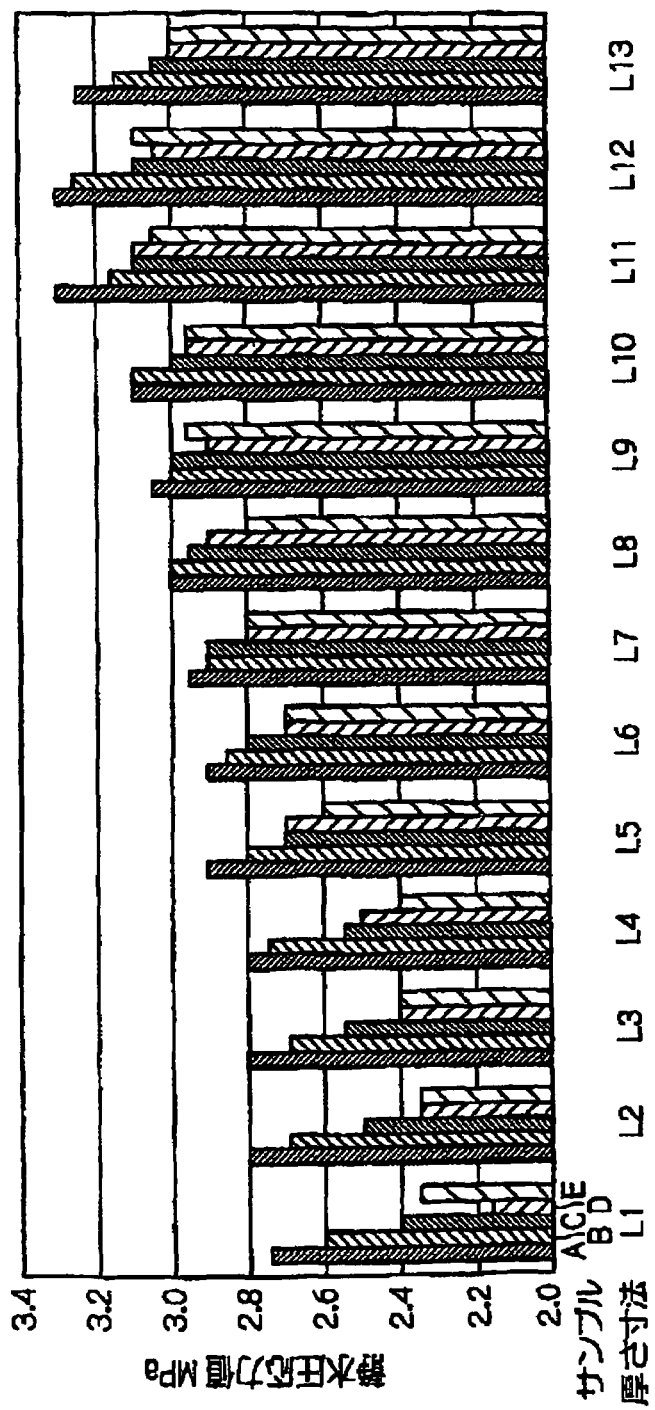
FIG. 4 is a graph showing the relationship between the thickness of the rubber plate in each sample and the isostatic stress level.

The graph of FIG. 4 shows the isostatic stress occurring in the rubber plates 14 when the samples are applied with a predetermined load in the shearing direction and a prying deformation is thereby caused. This graph reveals that, with respect to all the samples, the isostatic stress exhibits an increasing tendency from the free end side toward the fixed end side, and the maximum isostatic stress occurs in those rubber plates 14 in the region corresponding to the thicknesses L11 to L13.

It has been judged that samples B, C and D are optimum in that they exhibited lower value of the isostatic stress, as compared to sample A with the rubber plates 14 of the constant thickness, and sample E wherein some rubber plates have the same thickness. The graph of FIG. 4 further reveals a tendency that the overall isostatic stress becomes lower as the ratio of the thickness L13 to the thickness L1 is increased. However, if this ratio is excessively large, the spring constant of the laminated rubber body 16 as a whole becomes excessively low. Thus, it is considered that an optimum thickness ratio is 1.5.

In the embodiments described above, the rubber plates 14 are each designed to have a thickness that is gradually changed from the fixed end side toward the free end side. However, the thickness of the rubber plates 14 may be changed for each set of two or three layers, such that L1, L2, . . . , L12, L13 are 17.5 mm, 17.5 mm, 17.0 mm, 17.0 mm . . . , or 17.5 mm, 17.5 mm, 17.5 mm, 17.0 mm, 17.0 mm 17.0 mm . . . , for example.

Furthermore, in the embodiments described above, due to the mutually different thickness of the rubber layers 14, the injection amount of the rubber material in the production stage of the laminated rubber body 16 are variable. In this instance, when the rubber material is vulcanized in a conventional manner, bending may occur to the hard plates 12 due to the differential injection balance. To cope with such a problem, it would be desirable to make the size of the injection gates variable, in the manner to be described below.

Production Method

One embodiment of the production method for the vibration damping system will be explained with reference to FIGS. 5 to 8. Those elements already described with reference to the first embodiment of the vibration damping system are denoted by the same reference numerals to eliminate an overlapping description. In the first embodiment of the vibration damping system, as shown in FIG. 1, flange members 18, 20 made of rectangular metal plate are arranged on the upper and lower sides of the laminated rubber body 16, which is formed by alternately laminating annular hard plates 12 and annular rubber plates 14. Such a laminated rubber body 16 is suitably produced by a mold, the particulars of which will be explained below.

Figure 5:
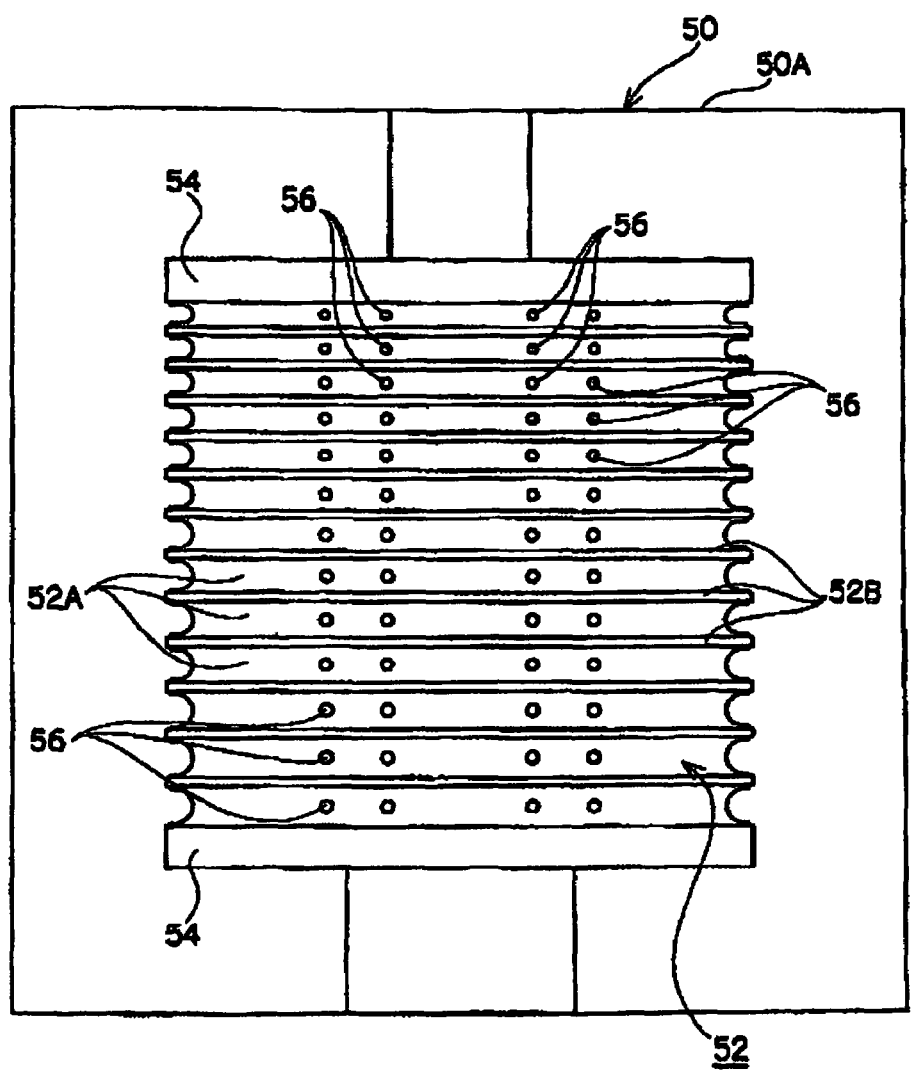
FIG. 5 is a front view showing an upper mold member in a mold applicable to the production method according to the present invention.
Figure 6:
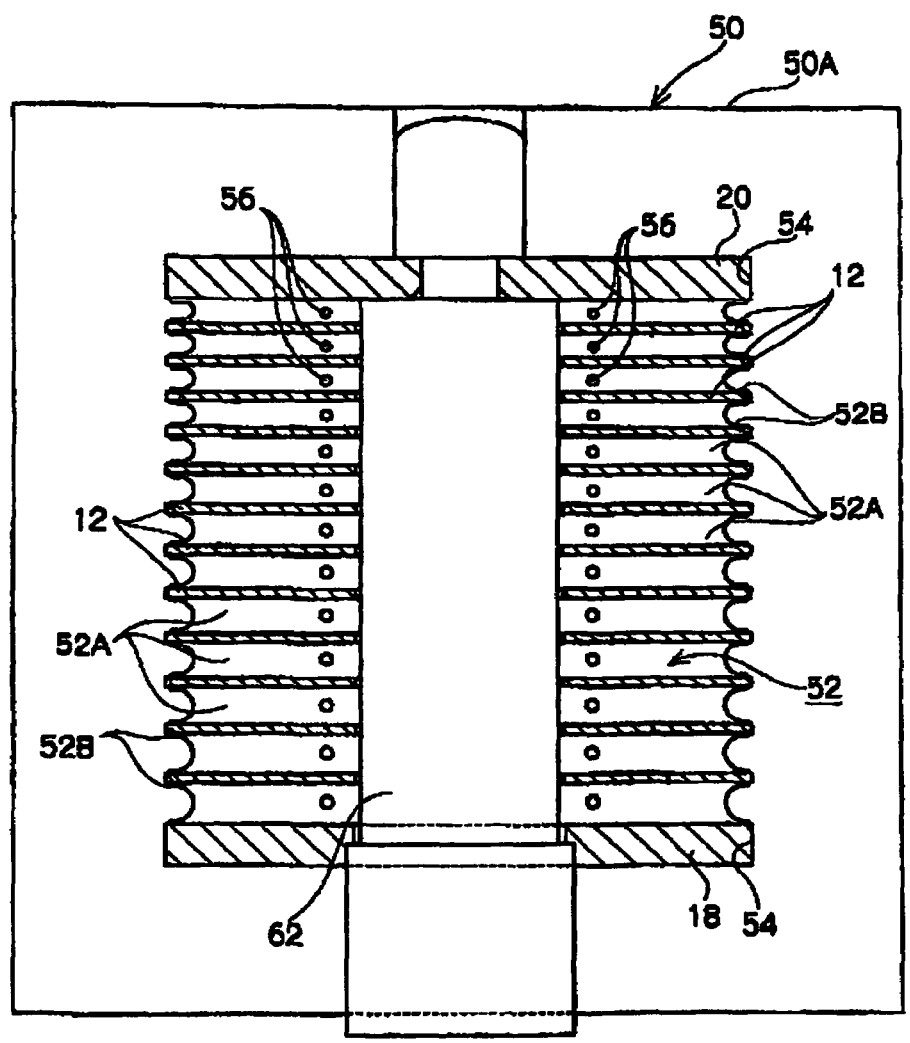
FIG. 6 is a front view showing the upper mold member, with a mandrel for the cavity, hard plates and flange members installed in place.
Figure 7:
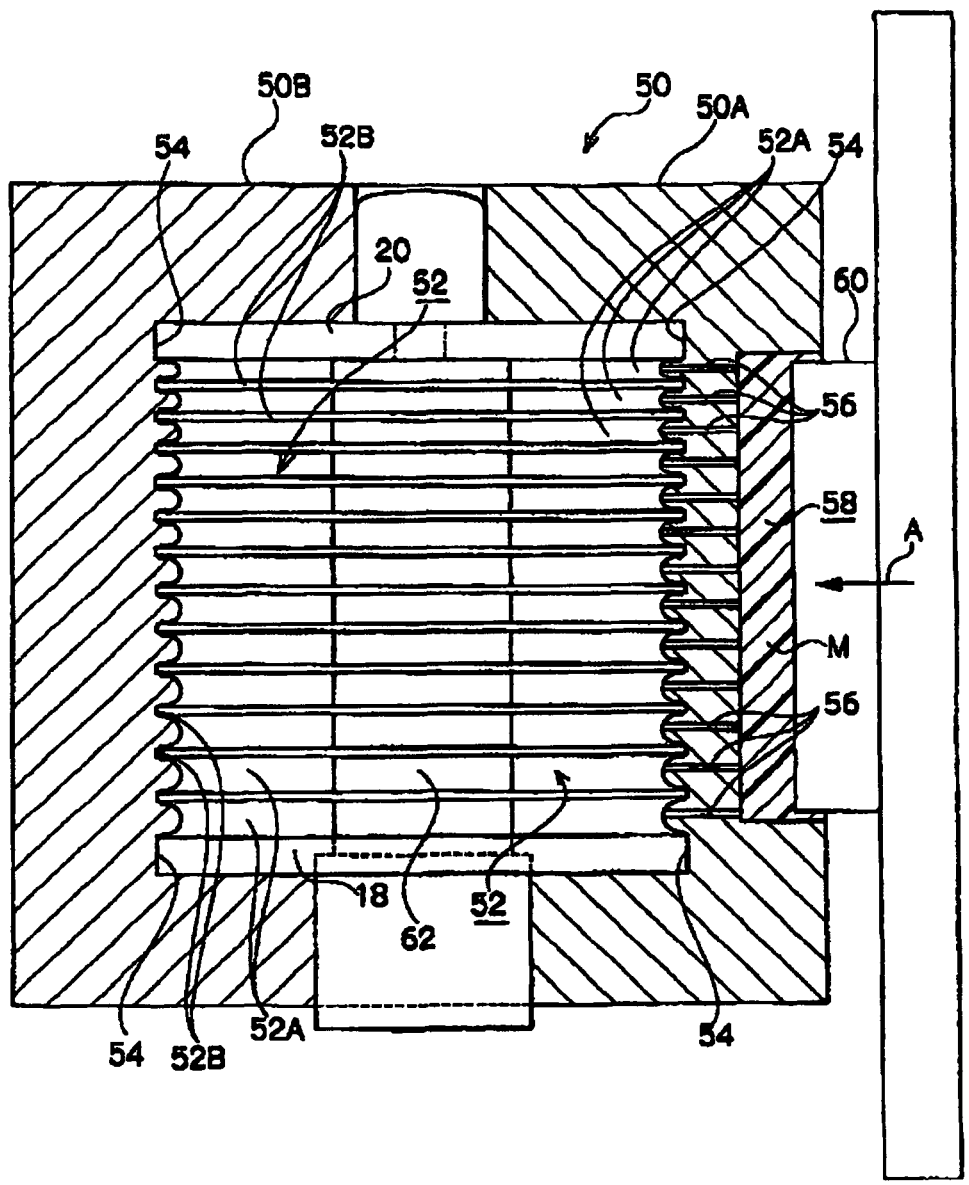
FIG. 7 is a sectional view showing a mold applicable to the production method according to the present invention.

As shown in FIGS. 5 to 7, the mold 50 is comprised of an upper mold member 50A and a lower mold member 50B, each having a substantially semi-cylindrical recess 52 in its center region. By assembling the upper and lower mold members 50A, 50B, a substantially cylindrical internal cavity is formed. The substantially semi-cylindrical recesses 52 of the upper and lower mold members 50A, 50B are each formed with a plurality of arcuate groove portions 52B, in which the annular hard plates 12 can be inserted, respectively. The arcuate groove portions 52B are juxtaposed to each other. The regions of the upper and lower mold members 50A, 50B between these groove portions 52B form rubber plate forming sections 52A having an arcuate shape, respectively, so that also the rubber plate forming sections 52A are juxtaposed to each other.

It is noted that, in the vibration damping system as shown in FIG. 1, the rubber plates 14 are designed to have a mutually different thickness so that the thickness of the rubber plates 14 is gradually decreased from the side of the flange member 18 on one end in the laminating direction toward the flange member 20 on the other end. Corresponding to such an arrangement, the mold 50 is designed so that the plurality of rubber plate forming sections 52A in the upper and lower mold members 50A, 50B have a gradually decreasing thickness. Furthermore, on both end portions of the recesses 52 in the upper and lower mold members 50A, 50B of the mold 50, further recesses 54 are provided for receiving the flange members 18, 20.

For each region of the upper mold member 50A corresponding to the rubber plate forming section 52A, as shown in FIG. 5, there are provided four injection gates 56 for injecting a material M for the rubber plates 14, such as a rubber material. These injection gates 56 are arranged along the direction, in which the arcuate shape of the rubber plate forming section 52A extends. Each injection gate 56 is provided in the mold 50 corresponding to the relevant rubber plate 14, and designed to have an opening sectional area that is reduced proportionally to the thickness of the rubber plate forming section 52A and, hence, the thickness of the rubber plates 14. The diameter of the injection gate 56 in the rubber plate forming section 52A is selected to be within the range from 3.9 mm to 4.4 mm, for example.

The upper mold member 50A is provided, as particularly shown in FIG. 7, with a reservoir 58 in communication with the injection gates 56, for storing a rubber material M for the rubber plates 14. At a location opposite to the reservoir 58, there is provided a press die 60 for injecting the rubber material from the reservoir 58 into the cavity defined by the recess 52 of the mold 50. Therefore, upon production of the laminated rubber body 16, the press die 60 is moved toward the reservoir 58 so that the rubber material M in the reservoir 58 is injected into the cavity of the mold 50 through the respective injection gates 56.

A concrete procedure of the production method for the vibration damping system according to the present embodiment will be described below. In order to produce the vibration damping system 10, first of all, the mold 50 is formed with rubber plate forming sections 52A so that the plurality of rubber plates 14 are different from each other in thickness. In this instance, the upper mold member 50A of the mold 50 is provided with four injection gates 56 for each rubber plate 14 such that the opening sectional area is decreased as the thickness of the rubber plates 14 decreases.

Then, with respect to a mandrel 62, which has been previously provided for forming the cavity 17 (FIG. 1) in the center region of the laminated rubber body 16, the annular hard plates 12 of a required number are passed over the mandrel, as shown in FIG. 6. Furthermore, the flange members 18, 20 are arranged on the upper and lower sides of the mandrel 62, respectively.

Figure 8:
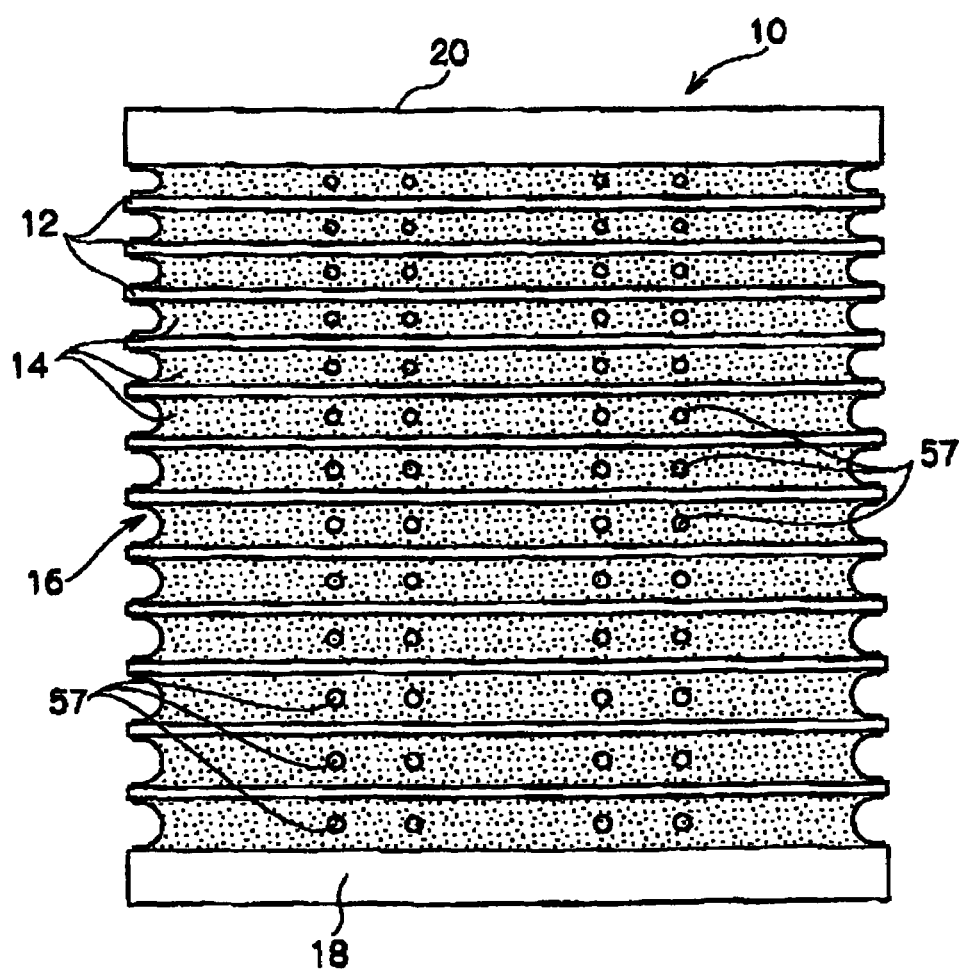
FIG. 8 is a front view showing the vibration damping system produced by the method according to the present invention.

In such a state, the upper and lower mold members 50A, 50B are assembled to each other with the above-mentioned members retained in the center recess 52, so as to close the mold 50. The press die 60 is then moved toward the reservoir 58, as shown by arrow A, so that the rubber material M for the rubber plates 14 is injected into the mold 50 through the respective injection gates 56, to thereby form the rubber plates 14 between the hard plates 12. By this, a vibration damping system as shown in FIG. 8 is obtained, which includes the laminated rubber body 16 with flange members 18, 20 adhered thereto. On this occasion, corresponding to the positions of the injection gates 56, four injection marks 57 as shown in FIG. 8 are left in each rubber plate 14 of the laminated rubber body 16.

The production method as described above allows production of a vibration damping system 10 including a laminated rubber body 16, which is comprised of a hybrid laminated body wherein a plurality of hard plates 12 having a rigidity and a plurality of rubber plates 14 having a viscoelasticity are alternately laminated with each other. On this occasion, the rubber material for the rubber plates 14 is simultaneously injected into the mold 50 through the respective injection gates 56, to form the rubber plates 14 between the respective hard plates 12. It is noted in this connection that the opening sectional area of the injection gates provided for each rubber plate 14 is decreased proportionally to the decreased thickness of the rubber plates 14.

In this way, by decreasing the opening sectional area of the injection gates 56 proportionally to the decreased thickness of the rubber plates 14, it is possible to substantially equalize the injection pressure of the rubber material from the injection gates 56 as between the different rubber plate forming sections 52A, thereby preventing bending or the like deformation of the hard plates 12, which would occur between the rubber plates 14 due to the differential injection pressure, if any.

It will be appreciated that the production method as explained above makes it readily possible to produce a vibration damping system 10 including a laminated rubber body 16 in which the rubber plate arranged in a region subjected to a higher isostatic stress is made relatively thick. Thus, by carrying out the production method for the vibration damping system according to the present invention, it is possible to more positively achieve the functional effects of suppressing possible formation of cracks in the rubber plates 14 included in the laminated rubber body 16 and effectively preventing damages to the laminated rubber body 16, thereby prolonging the service life of the vibration damping system 10.

Incidentally, in the production method for the vibration damping system according to the embodiment described above, the upper mold member 50A is provided with four injection gates 56 for each rubber plate 14. However, the number of the injection gates 56 is not limited to four, and it may be not more than three or not less than five. Also, the diameter of the injection gates is not limited to the numerical range explained above, and may have other dimension. Moreover, although the vibration damping system 10 produced by the method according to the present invention has been explained with reference to a structure in which a link chain 28 is not provided in the cavity 17 of the laminated rubber body 16, the production method is also applicable to a structure in which a link chain 28 is provided in the cavity 17.

The invention claimed is:

1. A vibration damping system comprising:
a laminated body including a plurality of hard plates having a rigidity, and a plurality of soft members having a viscoelasticity, said hard plates and said soft members being alternately laminated with each other;
said laminated body having one end portion in a laminating direction, said one end portion being connected to one of a vibration generation section and a vibration receiving section, and another end portion in the laminating direction, said another end portion being connected to the other of the vibration generation section and the vibration receiving section;
wherein, among said plurality of soft members, a soft member that is arranged in a region, which is subjected to a higher isostatic pressure, is thicker than soft members that are arranged in other regions,
wherein said one end portion of the laminated body in the laminating direction forms a fixed end that is fixedly connected to one of the vibration generation section and the vibration receiving section;
said another end portion of the laminated body in the laminating direction forms a free end that is movably connected to the other of the vibration generation section and the vibration receiving section; and
among said plurality of soft members, a soft member is softer in a region adjacent to the fixed end of the laminated body, than in other regions, and
wherein, among said plurality of soft members, a soft member arranged closer to the fixed end of the laminated body has a thickness, which is within a range from 1.3 times to 1.7 times of a thickness of a soft member arranged closer to the free end of the laminated body.

2. A vibration damping system according to claim 1, wherein said plurality of soft members are arranged so that their thickness is gradually reduced from the fixed end toward the free end of the laminated body.

3. A vibration damping system according to claim 1, wherein said plurality of soft members comprise a rubber material.

4. A vibration damping system according to claim 1, further comprising:
a pair of flange members connected to the vibration generation section and the vibration receiving section, respectively;
means for defining a cavity in said laminated body, said cavity extending through the laminated body in the laminating direction; and
a displacement restriction member arranged in said cavity with its both end portions connected to said pair of flange members, said displacement restriction member having a rigidity to a tensile load along the laminating direction of the laminated body, said rigidity being higher than that of the laminated body, said displacement restriction member being deformable in a shearing direction intersecting at right angles to said laminating direction.

5. A vibration damping system according to claim 4, wherein said displacement restriction member comprises a link chain which, in turn, comprises a plurality of link elements that are linearly connected to each other.

6. A production method for producing a vibration damping system comprising a laminated body including a plurality of hard plates having a rigidity, and a plurality of soft members having a viscoelasticity, said hard plates and said soft members being alternately laminated with each other; wherein the production method comprises a step of:
using a mold having at least one injection gate for injecting a material for constituting the soft members, said injection gate being designed so that material for constituting the soft members can be injected to form the plurality of soft members between said hard plates, said soft members each having a different thickness, said injection gate having an opening sectional area that is variable in accordance with a change in thickness of the soft members,
wherein said laminated body having one end portion in a laminating direction, said one end portion being connected to one of a vibration generation section and a vibration receiving section, and another end portion in the laminating direction, said another end portion being connected to the other of the vibration generation section and the vibration receiving section,
wherein said one end portion of the laminated body in the laminating direction forms a fixed end that is fixedly connected to one of the vibration generation section and the vibration receiving section,
wherein said another end portion of the laminated body in the laminating direction forms a free end that is movably connected to the other of the vibration generation section and the vibration receiving section,
wherein among said plurality of soft members, a soft member is softer in a region adjacent to the fixed end of the laminated body, than in other regions, and
wherein among said plurality of soft members, a soft member arranged closer to the fixed end of the laminated body has a thickness, which is within a range from 1.3 times to 1.7 times of a thickness of a soft member arranged closer to the free end of the laminated body.

7. A production method according to claim 6, wherein said opening sectional area of the injection gate is proportionally variable in accordance with the change in thickness of the soft members.

8. A mold adapted to be used for producing a vibration damping system comprising a laminated body including a plurality of hard plates having a rigidity, and a plurality of soft members having a viscoelasticity, said hard plates and said soft members being alternately laminated with each other, wherein said mold includes at least one injection gate for injecting a material for constituting the soft members, said injection gate being designed so that material for constituting the soft members can be injected to form the plurality of soft members between said hard plates, said soft members each having a different thickness, said injection gate having an opening sectional area that is variable in accordance with a change in thickness of the soft members,
wherein said laminated body having one end portion in a laminating direction, said one end portion being connected to one of a vibration generation section and a vibration receiving section, and another end portion in the laminating direction, said another end portion being connected to the other of the vibration generation section and the vibration receiving section, wherein said one end portion of the laminated body in the laminating direction forms a fixed end that is fixedly connected to one of the vibration generation section and the vibration receiving section, wherein said another end portion of the laminated body in the laminating direction forms a free end that is movably connected to the other of the vibration generation section and the vibration receiving section, wherein among said plurality of soft members, a soft member is softer in a region adjacent to the fixed end of the laminated body, than in other regions, and wherein, among said plurality of soft members, a soft member arranged closer to the fixed end of the laminated body has a thickness, which is within a range from 1.3 times to 1.7 times of a thickness of a soft member arranged closer to the free end of the laminated body.

9. A mold according to claim 8, wherein said opening cross-sectional area of the injection gate is proportionally variable in accordance with the change in thickness of the soft members.

* * * * *